US012664850B2

(12) United States Patent
Noh et al.

(10) Patent No.: US 12,664,850 B2
(45) Date of Patent: Jun. 23, 2026

(54) AUTOMATED TELLER MACHINE

(71) Applicant: HYOSUNG TNS INC., Seoul (KR)

(72) Inventors: Jeong Ho Noh, Seoul (KR); Youngho Han, Seoul (KR); Seungin Lee, Seoul (KR); Myoungho Shin, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 19/076,211

(22) Filed: Mar. 11, 2025

(65) Prior Publication Data

US 2025/0292643 A1 Sep. 18, 2025

(30) Foreign Application Priority Data

Mar. 15, 2024 (KR) ........................ 10-2024-0036533

(51) Int. Cl.
*G07D 11/13* (2019.01)
*G07D 11/16* (2019.01)
*G07F 19/00* (2006.01)

(52) U.S. Cl.
CPC ............. *G07D 11/13* (2019.01); *G07D 11/16* (2019.01); *G07F 19/202* (2013.01); *G07F 19/203* (2013.01); *G07D 2211/00* (2013.01)

(58) Field of Classification Search
CPC . G07F 19/202; G07F 19/203; G07D 2211/00; G07D 11/00; G07D 11/10; G07D 11/13; G07D 11/16
See application file for complete search history.

(56) References Cited

U.S. PATENT DOCUMENTS

2007/0034683 A1* 2/2007 Eastman ................ G07D 11/14 235/379
2008/0023905 A1 1/2008 Graef et al.
(Continued)

FOREIGN PATENT DOCUMENTS

EP 3480795 A1 5/2019
EP 4246475 A1 9/2023
(Continued)

OTHER PUBLICATIONS

Notice of Allowance in Korean Application No. 10-2024-0036533 dated Sep. 29, 2025 and English translation thereof.
(Continued)

*Primary Examiner* — Laura A Gudorf
(74) *Attorney, Agent, or Firm* — BACON&THOMAS,PLLC

(57) ABSTRACT

An automated teller machine includes: a storage unit configured to store a medium; a reception unit where deposit and withdrawal of the medium is made; and an identification unit configured to recognize the medium through identification. The storage unit includes: a holder for holding the medium; a housing for accommodating the holder; and a push plate movable in one direction to provide a space in which the medium is stored. A holder upper surface portion is formed on an upper side of the holder. The holder upper surface portion includes a first holder upper surface portion disposed adjacent to the push plate, and a second holder upper surface portion disposed on a side opposite to the first holder upper surface portion. The first holder upper surface portion and the second holder upper surface portion are formed with different inclinations with respect to a center of the holder upper surface portion.

8 Claims, 9 Drawing Sheets

(56) References Cited

U.S. PATENT DOCUMENTS

| | | | |
|---|---|---|---|
| 2014/0061222 | A1 | 3/2014 | Allan et al. |
| 2016/0379452 | A1 | 12/2016 | Turocy et al. |
| 2024/0013604 | A1 | 1/2024 | Beskitt et al. |

FOREIGN PATENT DOCUMENTS

| | | | | | |
|---|---|---|---|---|---|
| JP | 2007125899 | A | | 5/2007 | |
| JP | 2016212676 | A | | 12/2016 | |
| KR | 1020200085865 | A1 | | 7/2020 | |
| KR | 20230061002 | A | * | 5/2023 | ........... G07F 19/201 |

OTHER PUBLICATIONS

Notice of Allowance in RU Application No. 2025105970 dated Oct. 9, 2025 and English translation thereof.

* cited by examiner

"A"

"B"

AUTOMATED TELLER MACHINE

TECHNICAL FIELD

The present disclosure relates to an automated teller machine.

BACKGROUND

An automated teller machine is a device installed in a place other than a counter at a financial institution, such as a bank, to allow customers to conveniently use various financial services regardless of time and place, and can provide various financial services such as cash deposits and withdrawals, account transfers, balance inquiries, and passbook updates.

The automated teller machine may include a storage unit capable of storing mediums such as cash or checks, and the storage unit may store an appropriate amount of mediums. The mediums stored in the storage unit may be taken out from a medium storage box upon a customer's withdrawal request, and new mediums may be brought into the storage unit upon a customer's deposit request. As such, the mediums stored in the storage unit need to be maintained in an appropriate amount in preparation for a customer's deposit or withdrawal request, and it is necessary to monitor and manage in real time whether an appropriate amount of mediums is stored in the medium storage box.

However, in automated teller machines, there is a problem that mediums may get stuck in a narrow space other than the space where the mediums are to be stored in the storage unit. Since the medium generally has the thickness of paper, it is easy to get into a thin gap.

In addition, since a holder that rotates to store the mediums in the storage space has a constant curvature radius, the holder may collide with the stacked mediums as it rotates, disrupting the alignment of the stacked mediums.

SUMMARY

In view of the above, the present disclosure provides an automated teller machine in which mediums can be stably inserted into a storage unit from a holder.

In accordance with one aspect of the present disclosure, there is provided an automated teller machine including: a storage unit configured to store a medium; a reception unit where deposit and withdrawal of the medium is made; and an identification unit configured to recognize the medium through identification, wherein the storage unit includes: a holder for temporarily holding the medium; a housing for accommodating the holder; and a push plate movable in one direction to provide a space in which the medium is stored, and wherein a holder upper surface portion is formed on an upper side of the holder, wherein the holder upper surface portion includes: a first holder upper surface portion disposed adjacent to the push plate; and a second holder upper surface portion disposed on a side opposite to the first holder upper surface portion, and wherein the first holder upper surface portion and the second holder upper surface portion are formed with different inclinations with respect to a center of the holder upper surface portion.

Further, a curvature radius of the first holder upper surface portion may be greater than a curvature radius of the second holder upper surface portion.

Further, an end of the first holder upper surface portion in the one direction may be contactable with the push plate.

Further, the holder may be rotated so that the medium is fed toward the push plate.

Further, when the holder is rotated, an end of the second holder upper surface portion in the one direction may not contact the push plate.

Further, the holder may include: a plurality of holder protrusions arranged along an extension direction of the holder; and a plurality of holder through-holes formed between the plurality of holder protrusions, and each of the plurality of holder protrusions may have a shape that protrudes in a direction that is different from the extension direction of the holder.

Further, the housing may include: a plurality of housing protrusions inserted into the plurality of holder through-holes; and a side wall extending between the plurality of housing protrusions.

Further, the holder may include a first holder and a second holder, which are arranged to be spaced apart in a direction different from the one direction.

According to embodiments of the present disclosure, the holder does not collide with the stacked mediums even when it rotates because the curvature radii of the front and rear sides of the holder are different.

In addition, according to embodiments of the present disclosure, it is possible to prevent mediums from getting stuck in a narrow gap between the holder and the housing.

DETAILED DESCRIPTION

A preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'transferred' to, or 'contacted' with another element, it should be understood that the element may be directly connected to, supported by, transferred to or contacted with the other element, but that other elements may exist in the middle.

The terms used in the present disclosure are only used for describing specific embodiments, and are not intended to limit the present disclosure. Singular expressions include plural expressions unless the context clearly indicates otherwise.

Furthermore, in the present disclosure, it is to be noted that expressions, such as the upper side, the lower side, and the side surface, are described based on the illustration of drawings, but may be modified if directions of corresponding objects are changed. For the same reason, a constituent element is illustrated in an exaggerated or schematic manner in the accompanying drawings, or is omitted therefrom. Constituent elements illustrated therein have not necessarily been drawn to scale.

Terms including ordinal numbers, such as first and second, may be used for describing various elements, but the corresponding elements are not limited by these terms. These terms are only used for the purpose of distinguishing one element from another element.

In the present specification, it is to be understood that the terms such as “including” are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Figure 1:
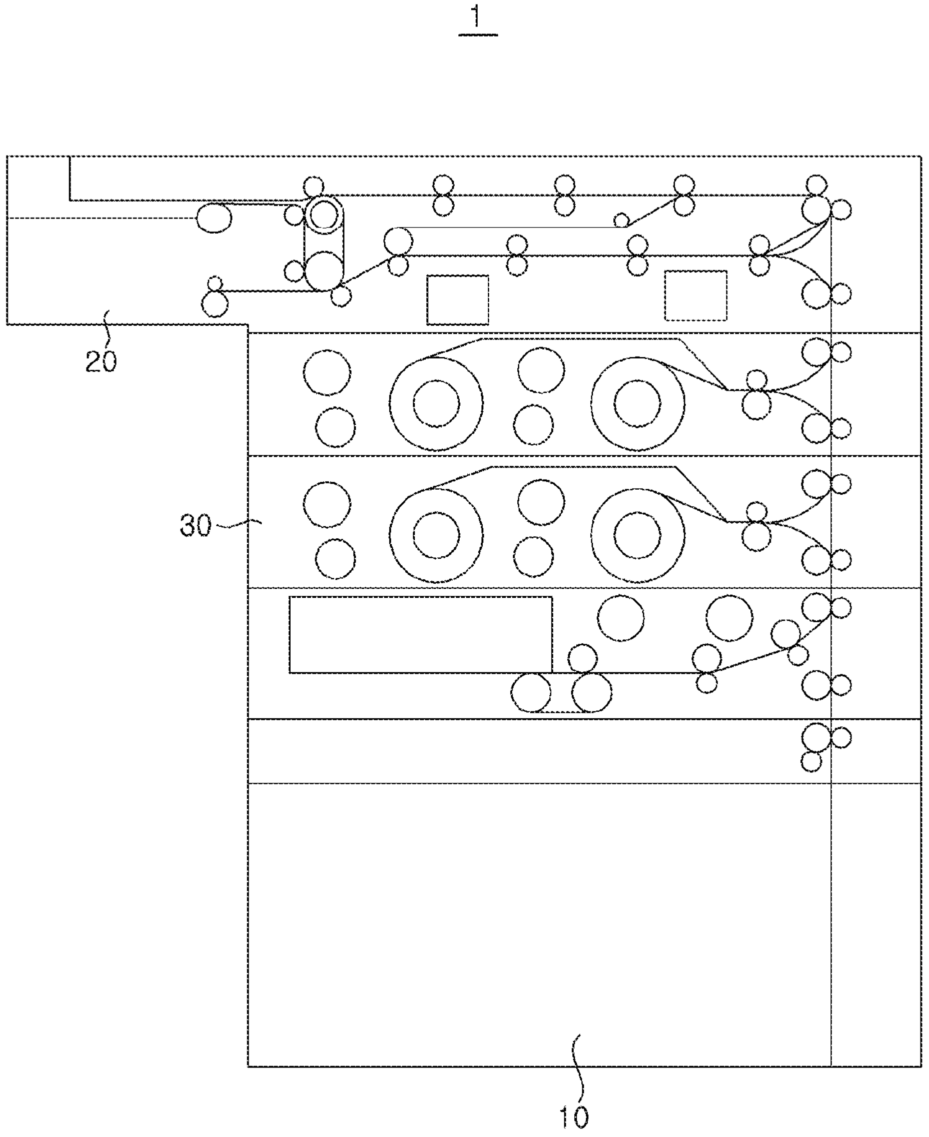
FIG. 1 is a conceptual diagram of an automated teller machine.
Figure 2:
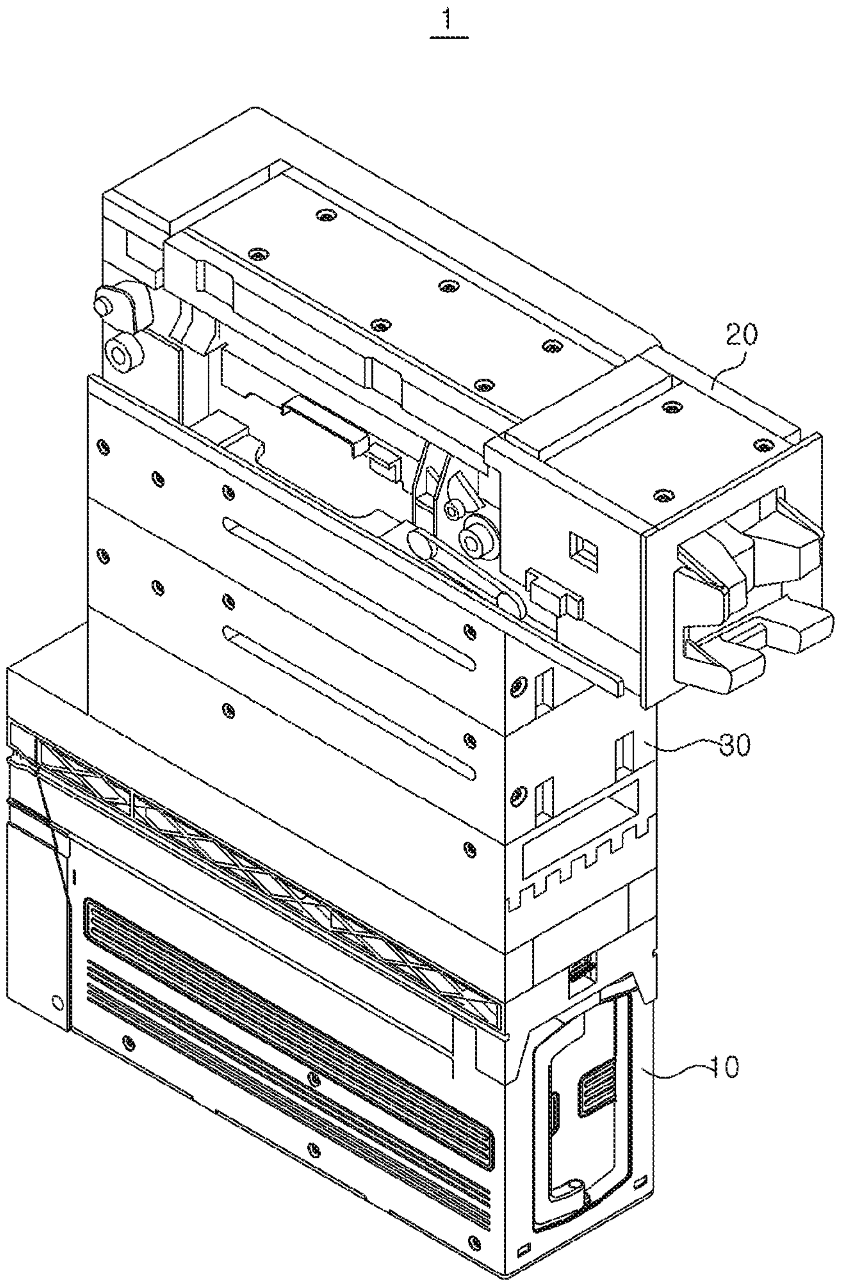
FIG. 2 is a perspective view of the automated teller machine.
Figure 3:
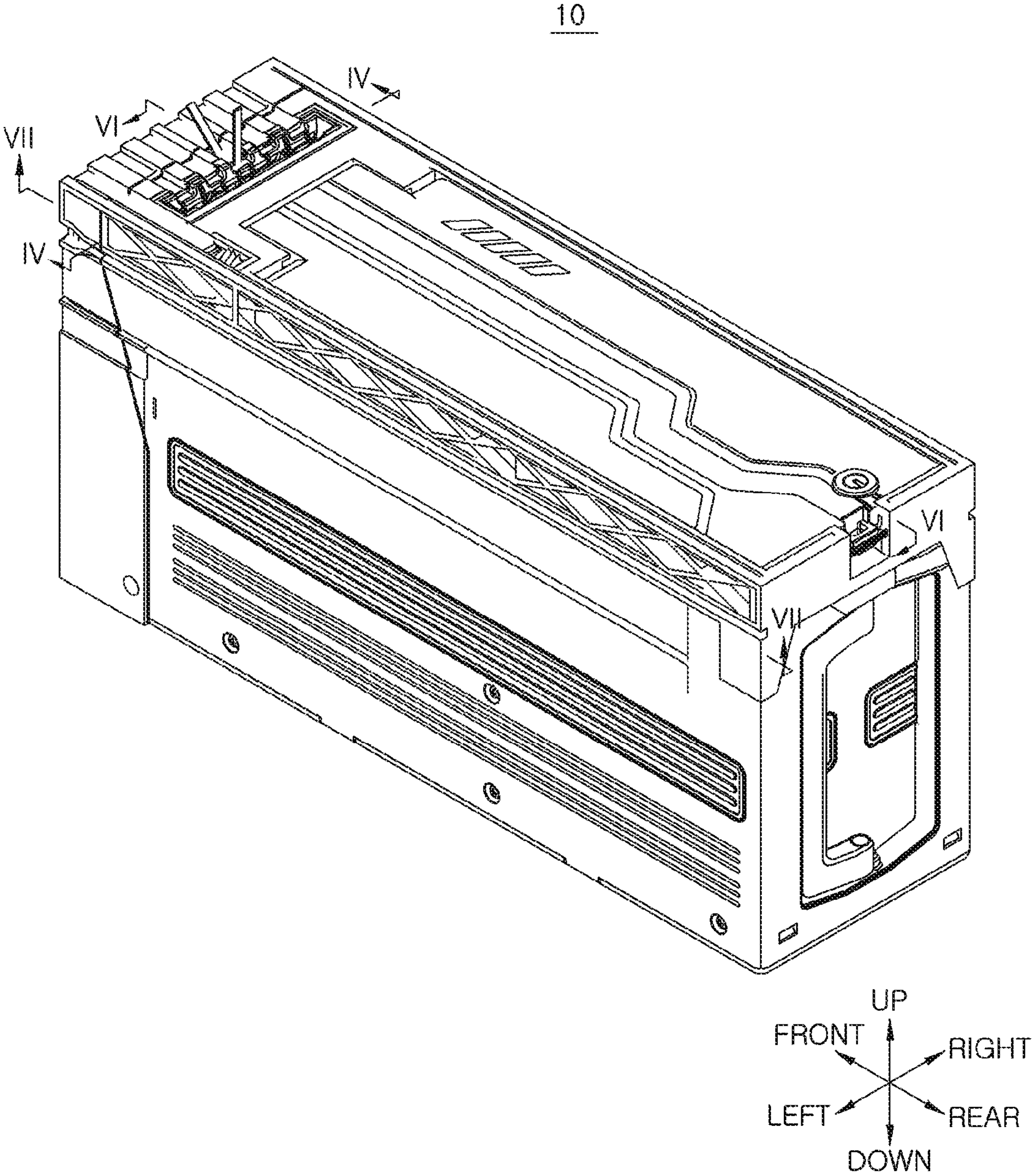
FIG. 3 is a perspective view of a storage unit of FIG. 2.
Figure 4:
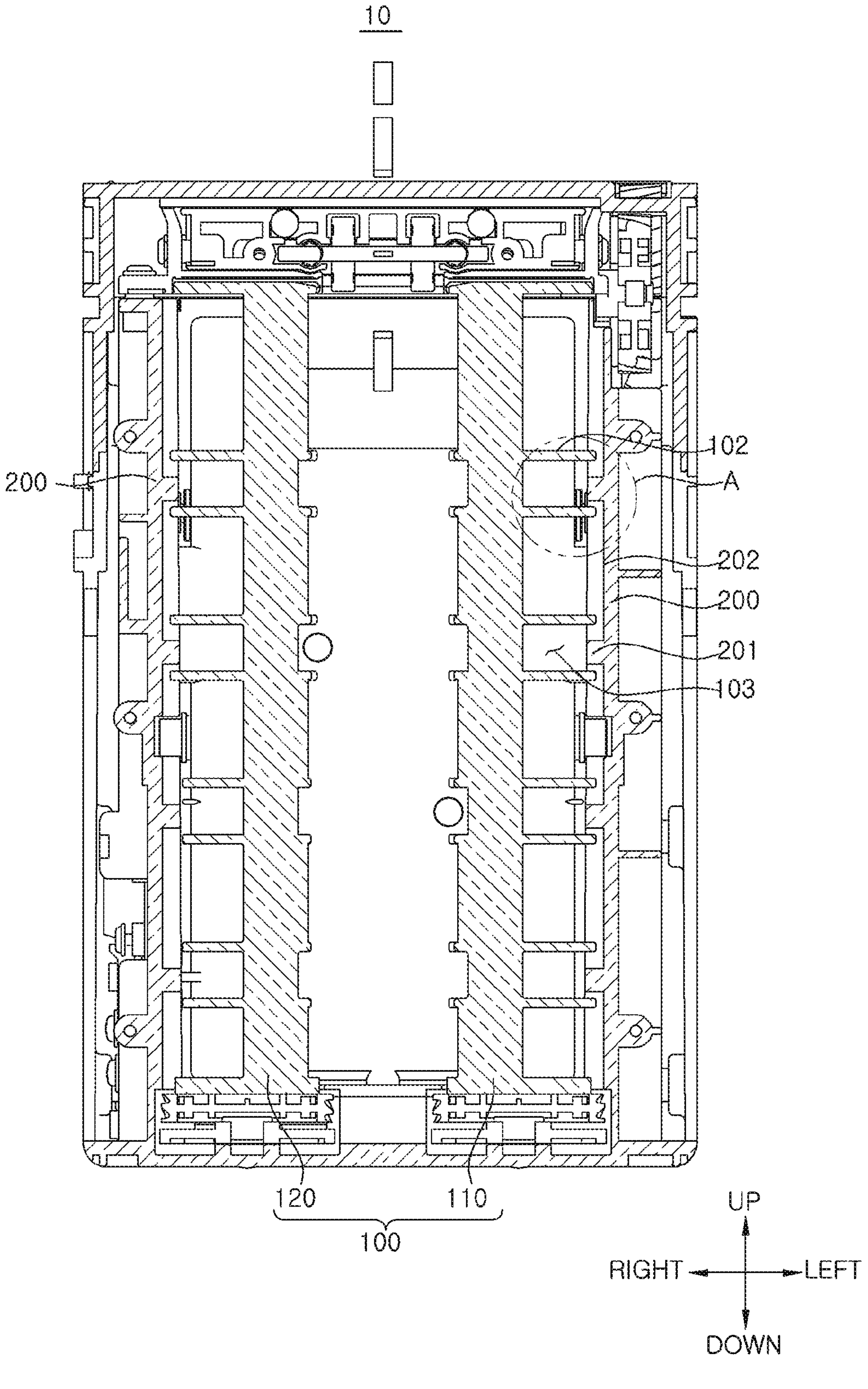
FIG. 4 is a cross-sectional view taken along line IV-IV in FIG. 3.
Figure 5:
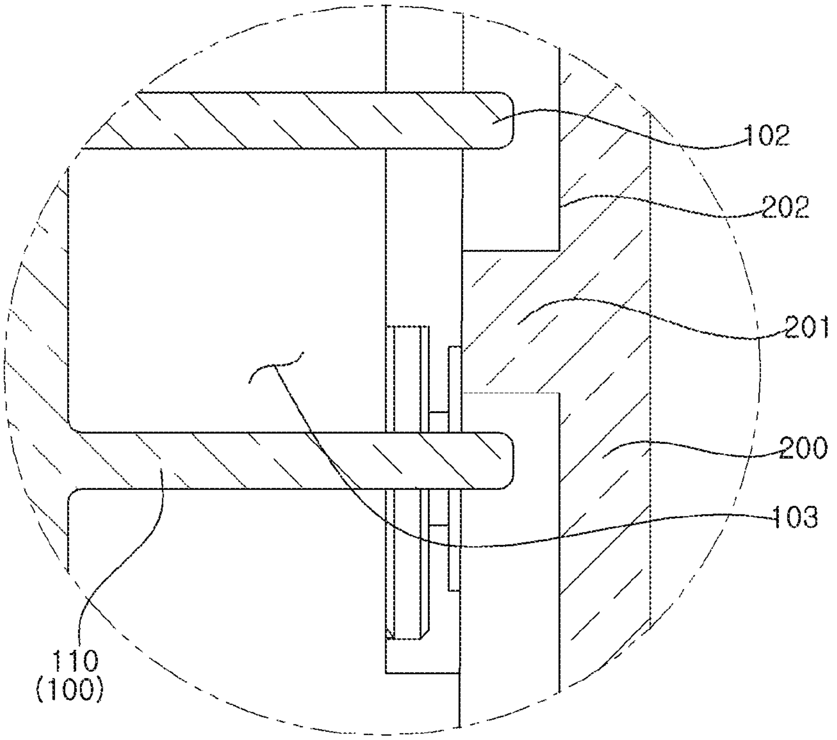
FIG. 5 is an enlarged view of part "A" in FIG. 4.
Figure 6:
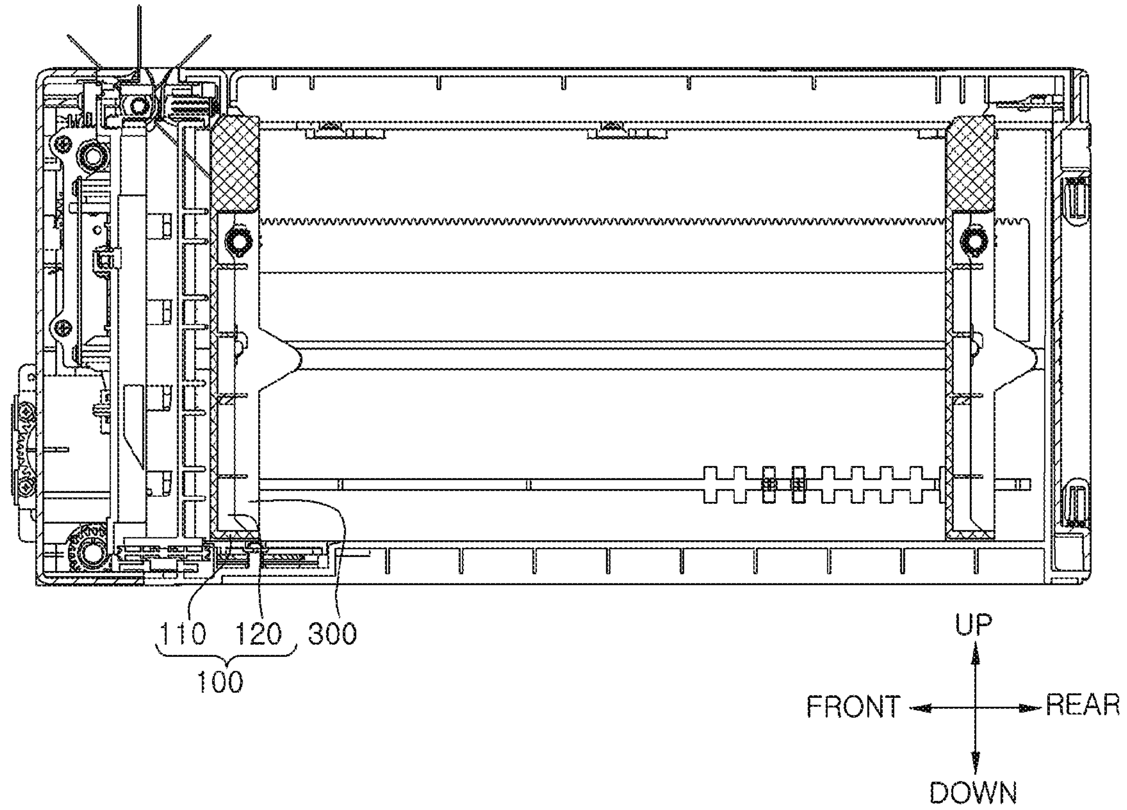
FIG. 6 is a cross-sectional view taken along line VI-VI in FIG. 3.
Figure 7:
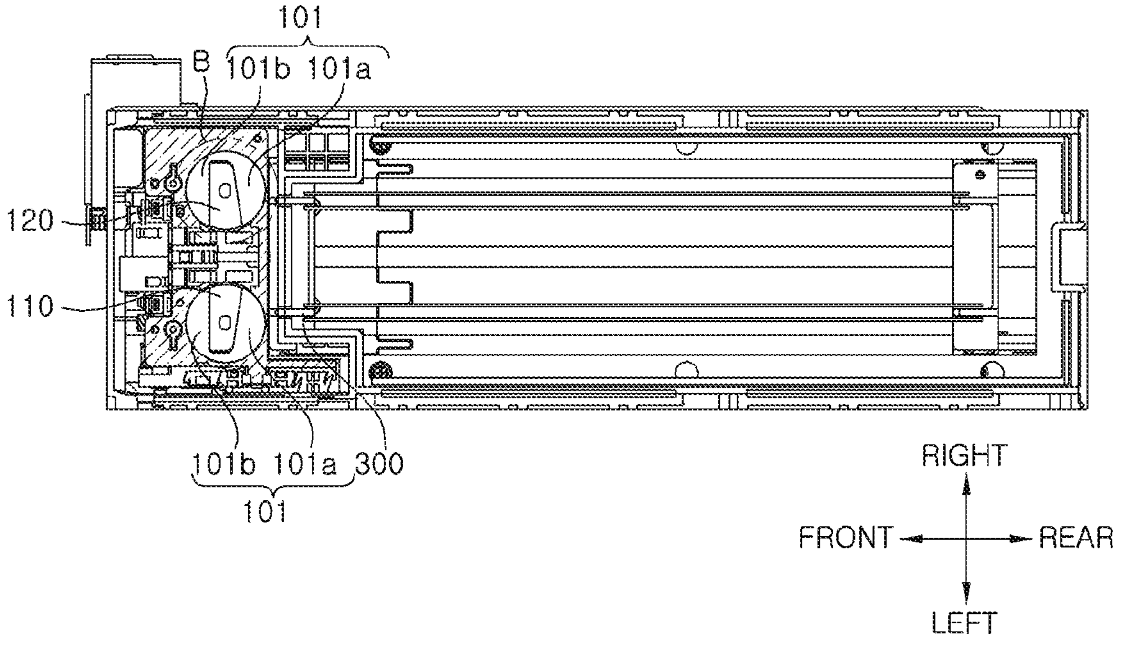
FIG. 7 is a cross-sectional view taken along line VII-VII in FIG. 3.
Figure 8:
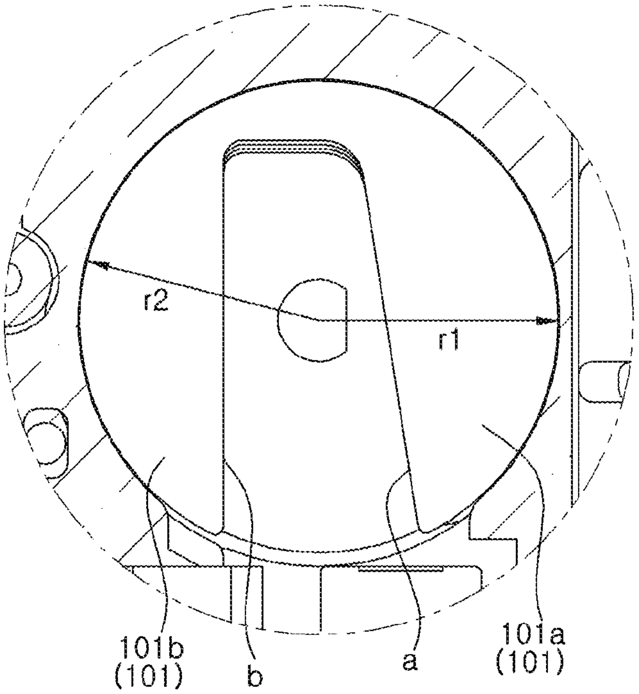
FIG. 8 is an enlarged view of part "B" in FIG. 7.

Hereinafter, an automated teller machine 1 according to one embodiment of the present disclosure will be described with reference to FIGS. 1 and 2. The automated teller machine 1 may be a device for performing financial transactions. The automated teller machine 1 may include a storage unit 10, a reception unit 20, and an identification unit 30.

Referring to FIGS. 3 to 8, the storage unit 10 may have a space for storing mediums. The storage unit 10 may include a handle for convenience of management. The storage unit 10 may be placed below the reception unit 20 and the identification unit 30. The storage unit 10 may include a holder 100, a housing 200, a push plate 300, and a step motor 400.

The holder 100 can temporarily hold mediums. The step motor 400 can rotate the holder 100. The holder may have a holder upper surface portion 101, a holder protrusion 102, and a holder through-hole 103. The holder 100 may include a first holder 110 and a second holder 120. The first holder 110 and the second holder 120 may be arranged to be spaced apart in a left and right direction. (see, FIG. 4)

The holder upper surface portion 101 may be formed flat on the upper side of the holder 100. The holder upper surface portion 101 may include a first holder upper surface portion **101*a* and a second holder upper surface portion 101*b***.

The first holder upper surface portion **101*a* may be disposed adjacent to the push plate 300. A rear end of the first holder upper surface portion 101*a* may contact the push plate 300. A curvature radius r1 of the first holder upper surface portion 101*a* may be larger than a curvature radius r2 of the second holder upper surface portion 101*b*. In other words, a distance from the center of the holder upper surface portion 101 to the end of the first holder upper surface portion 101*a* may be greater than a distance from the center of the holder upper surface portion 101 to the end of the second holder upper surface portion 101*b***.

The second holder upper surface portion **101*b* may be disposed on a side opposite to the first holder upper surface portion 101*a*. The inclination of the second holder upper surface portion 101*b* with respect to the center of the holder upper surface portion 101 may be greater than the inclination of the first holder upper surface portion 101*a* with respect to the center of the holder upper surface portion 101. By forming the inclination of the second holder upper surface portion 101*b* with respect to the center of the holder upper surface portion 101 to be greater than the inclination of the first holder upper surface portion 101*a* with respect to the center of the holder upper surface portion 101, a medium can be effectively arranged in front of the push plate 300. In other words, the inclination of an inclined portion a of the first holder upper surface portion 101*a* may be made smaller than the inclination of an inclined portion b of the second holder upper surface portion 101*b*. By making the inclination of the inclined portion a of the first holder upper surface portion 101*a* smaller than the inclination of an inclined portion b of the second holder upper surface portion 101*b*, the holder 100** can rotate without colliding with the medium.

The curvature radius r2 of the second holder upper surface portion **101*b* may be smaller than the curvature radius r1 of the first holder upper surface portion 101*a*. In other words, the distance from the center of the holder upper surface portion 101 to the end of the second holder upper surface portion 101*b* may be smaller than the distance from the center of the holder upper surface portion 101 to the end of the first holder upper surface portion 101*a*. Accordingly, even when the holder 100 is rotated to place a medium in front of the push plate 300, the end of the second holder upper surface portion 101*b* may not come into contact with the push plate 300. Since the curvature radius r2 of the second holder upper surface portion 101*b* is smaller than the curvature radius r1 of the first holder upper surface portion 101*a*, the medium can be stably placed in front of the push plate 300**.

A plurality of holder protrusions 102 may be provided. The plurality of holder protrusions 102 may be projections arranged along an extension direction of the holder 100. The holder protrusions 102 may have a shape that protrudes in a direction that is different from the extension direction of the holder 100. For example, the holder protrusions 102 may have a shape that protrudes in a horizontal direction, and the plurality of holder protrusions 102 may be arranged to be spaced apart from each other in an up and down direction. The holder protrusions 102 may be formed symmetrically on the first holder 110 and the second holder 120.

The holder through-hole 103 may be formed between the holder protrusions 102. The holder through-hole 103 may be formed symmetrically in the first holder 110 and the second holder 120.

The first holder 110 may be positioned on the left side relative to the second holder 120. The first holder 110 may rotate clockwise when a medium is placed in a central portion of the storage unit 10 in a left and right direction to place the medium in front of the push plate 300.

The second holder 120 may be positioned on the right side relative to the first holder 110. The second holder 120 may rotate counterclockwise when a medium is placed in the central portion of the storage unit 10 in the left and right direction to place the medium in front of the push plate 300.

The housing 200 may accommodate the holder 100. The housing 200 may be placed on the rear side of the holder 100. In order to prevent a medium from being caught between the housing 200 and the holder 100, the housing 200 may have a non-smooth structure. The housing 200 may have a housing protrusion 201 and a side wall 202.

The housing protrusion 201 can be inserted into the holder through-hole 103. A plurality of housing protrusions 201 may be provided. Since the housing protrusion 201 is inserted into the holder through-hole 103, it is possible to prevent the medium from being caught between the holder 100 and the housing 200.

The side wall 202 may extend between the plurality of housing protrusions 201. The side wall 202 may face the holder protrusions 102 formed on the holder 100. A gap between the side wall 202 and the holder protrusions 102 may be provided narrower than the space required for a medium to pass through. Accordingly, the medium can be prevented from being deviating from its movement path and being caught in the gap between the housing 200 and the holder 100, thereby avoiding loss of the medium or malfunction of the automated teller machine 1.

The push plate 300 can move in one direction to provide a space in which mediums are stored. When mediums are stacked in front of the push plate 300, the push plate 300 can move rearward to expand the space where mediums can be stacked. The push plate 300 may be provided on the rear side of the holder 100 and the housing 200.

Figure 9:
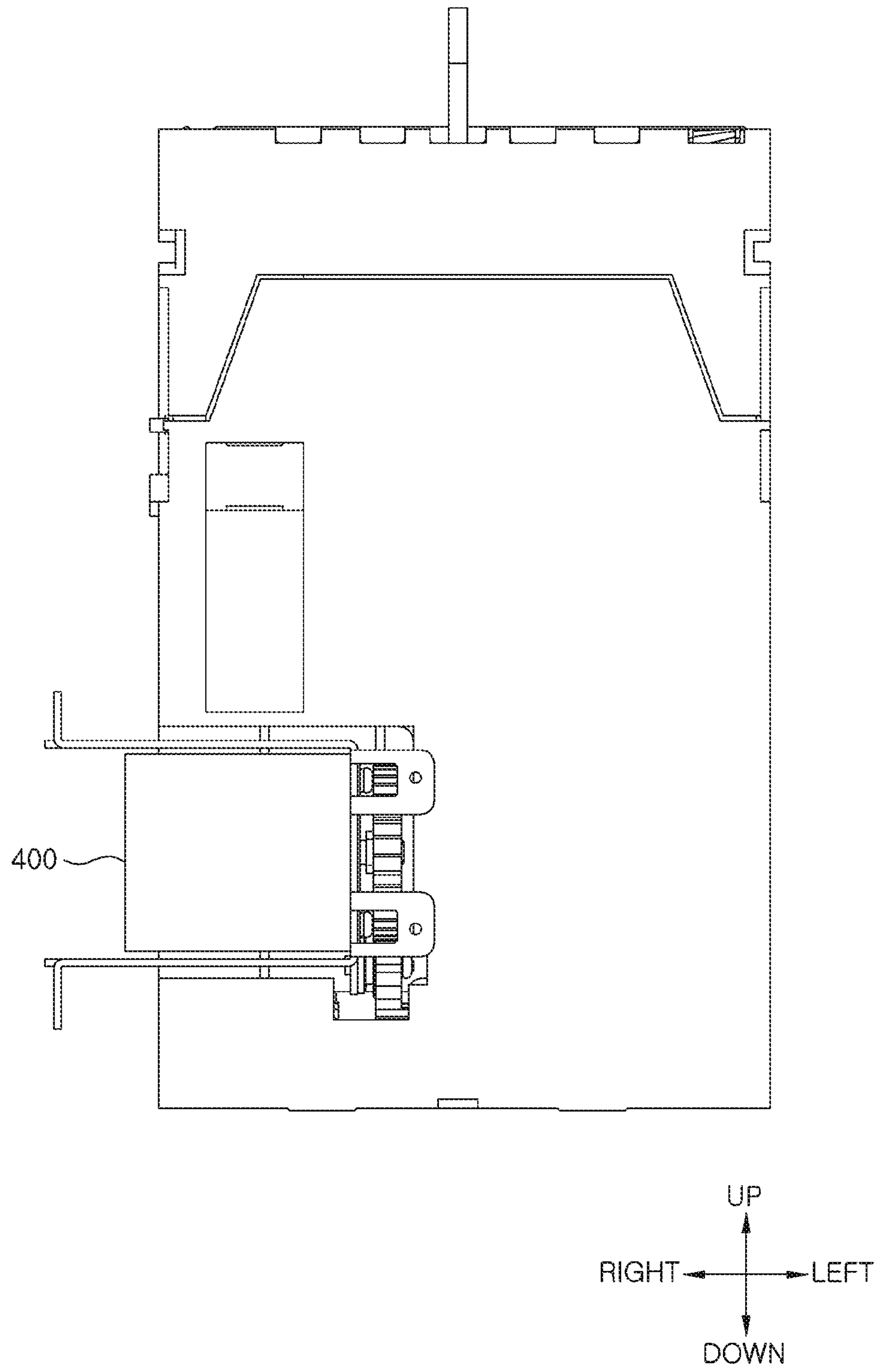
FIG. 9 is a front view of FIG. 3.

Referring to FIG. 9, the step motor 400 can provide driving force to the holder 100. When a medium moves into the storage unit 10, the step motor 400 can operate. The step motor 400 can rotate the holder 100 clockwise or counterclockwise. The step motor 400 may be disposed lower than a center of the storage unit 10 in the up and down direction.

The reception unit 20 may provide a space for receiving mediums deposited by a customer, and a space for dispensing mediums requested for withdrawal by a customer. The reception unit 20 may be disposed above the storage unit 10 and the identification unit 30. The reception unit 20 may include a deposit and withdrawal unit where customers deposit and withdraw mediums.

The identification unit 30 can recognize a medium through identification. The identification unit 30 can recognize a transferred medium as either a normal note or a rejected note by identifying the presence or absence of an abnormality in the transferred medium. The normal note may be a replenishment note that needs to be replenished in the automated teller machine 1 or a recovery note that needs to be collected from the automated teller machine 1. The rejected note is an abnormal note, and may be a damaged or counterfeit bill or a paper that is not a bill. For example, the rejected note may be a torn bill, a counterfeit bill, or a receipt. In addition, the identification unit 30 can identify the type of the transferred medium. For example, the identification unit 30 can identify whether the transferred medium is a 1,000 won bill, a 5,000 won bill, or a 10,000 won bill.

Hereinafter, the operation and effects of the automated teller machine 1 having the configuration described above will be described.

When the medium is deposited into the upper part of the storage unit 10, the step motor 400 can rotate the holder 100. When the medium is placed in the center of the storage unit 10 in the left and right direction, the first holder 110 can rotate clockwise and the second holder 120 can rotate counterclockwise when viewed from the top of the storage unit 10. The medium can be stably placed in front of the push plate 300.

In order to prevent the medium from being caught in the narrow space between the holder 100 and the housing 200, the holder protrusion 102 and the holder through-hole 103 are formed on the holder 100, and the housing protrusion 201 is formed on the housing 200. The housing protrusion 201 may be disposed inside the holder through-hole 103, and the holder protrusion 102 may be disposed inside the side wall 202.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. An automated teller machine comprising:
a storage unit configured to store a medium;
a reception unit where deposit and withdrawal of the medium is made; and
an identification unit configured to recognize the medium through identification,
wherein the storage unit includes:
a holder for temporarily holding the medium;
a housing for accommodating the holder; and
a push plate movable in one direction to provide a space in which the medium is stored, and
wherein a holder upper surface portion is formed on an upper side of the holder,
wherein the holder upper surface portion includes:
a first holder upper surface portion disposed adjacent to the push plate; and
a second holder upper surface portion disposed on a side opposite to the first holder upper surface portion, and
wherein the first holder upper surface portion and the second holder upper surface portion are formed with different inclinations with respect to a center of the holder upper surface portion.

2. The automated teller machine of claim 1, wherein a curvature radius of the first holder upper surface portion is greater than a curvature radius of the second holder upper surface portion.

3. The automated teller machine of claim 2, wherein an end of the first holder upper surface portion in the one direction is contactable with the push plate.

4. The automated teller machine of claim 3, wherein the holder is rotated so that the medium is fed toward the push plate.

5. The automated teller machine of claim 4, wherein when the holder is rotated, an end of the second holder upper surface portion in the one direction does not contact the push plate.

6. The automated teller machine of claim 1, wherein the holder includes:
a plurality of holder protrusions arranged along an extension direction of the holder; and
a plurality of holder through-holes formed between the plurality of holder protrusions, and
wherein each of the plurality of holder protrusions has a shape that protrudes in a direction that is different from the extension direction of the holder.

7. The automated teller machine of claim 6, wherein the housing includes:
a plurality of housing protrusions inserted into the plurality of holder through-holes; and
a side wall extending between the plurality of housing protrusions.

8. The automated teller machine of claim 1, wherein the holder includes a first holder and a second holder, which are arranged to be spaced apart in a direction different from the one direction.

* * * * *